March 22, 1960     R. DELL HULL     2,929,579
UNDERSLUNG SPINNING REEL
Filed Aug. 23, 1956     3 Sheets-Sheet 1
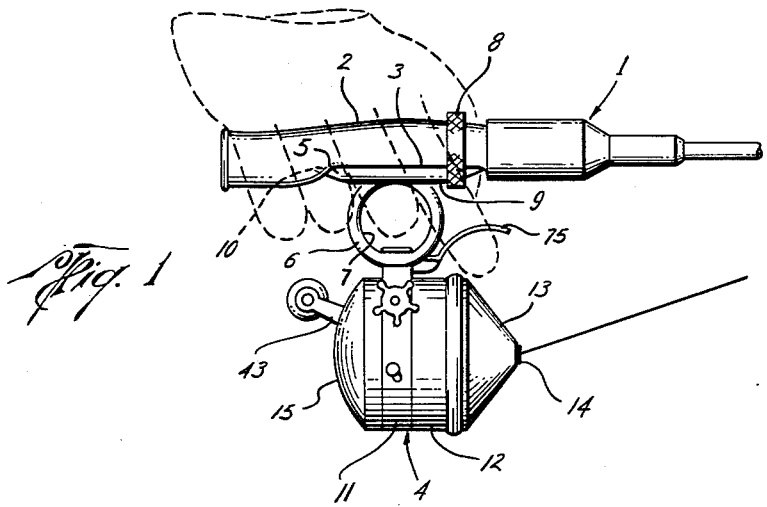
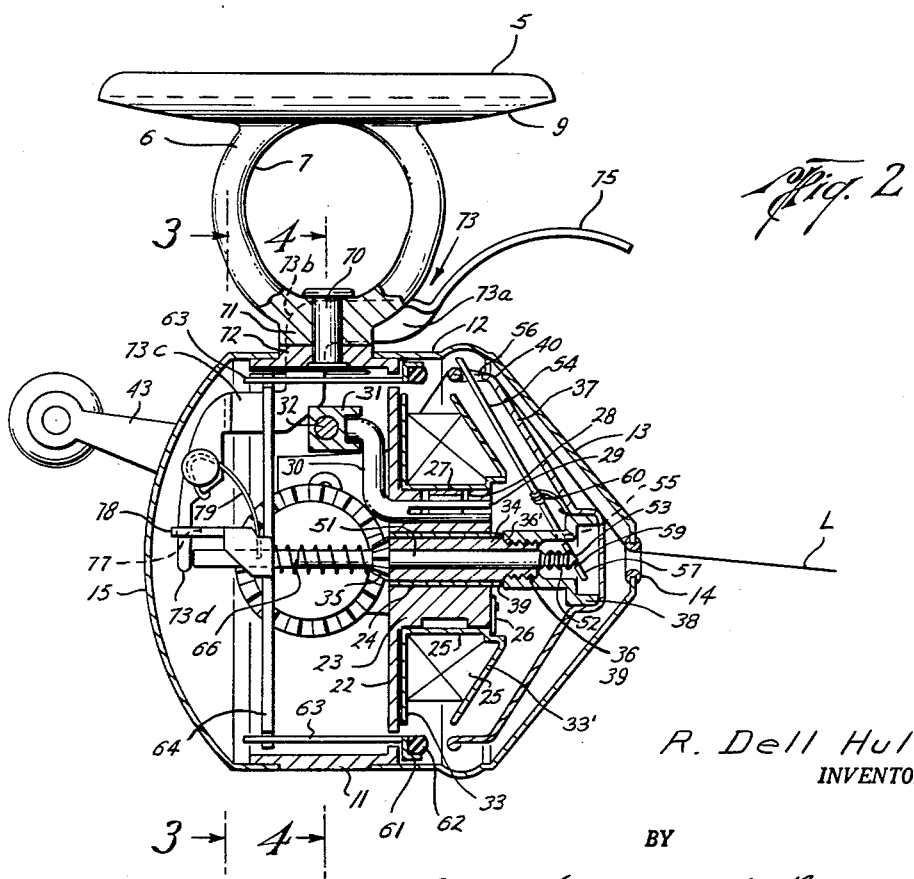
R. Dell Hull
INVENTOR.
BY
ATTORNEYS

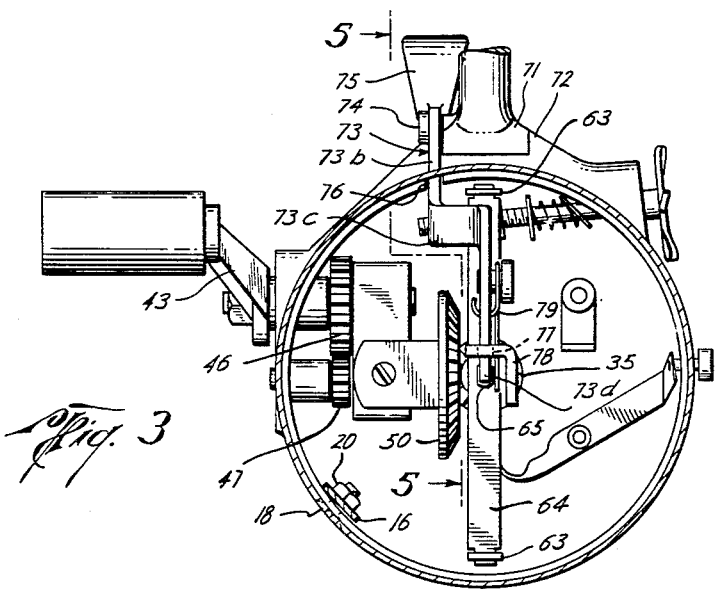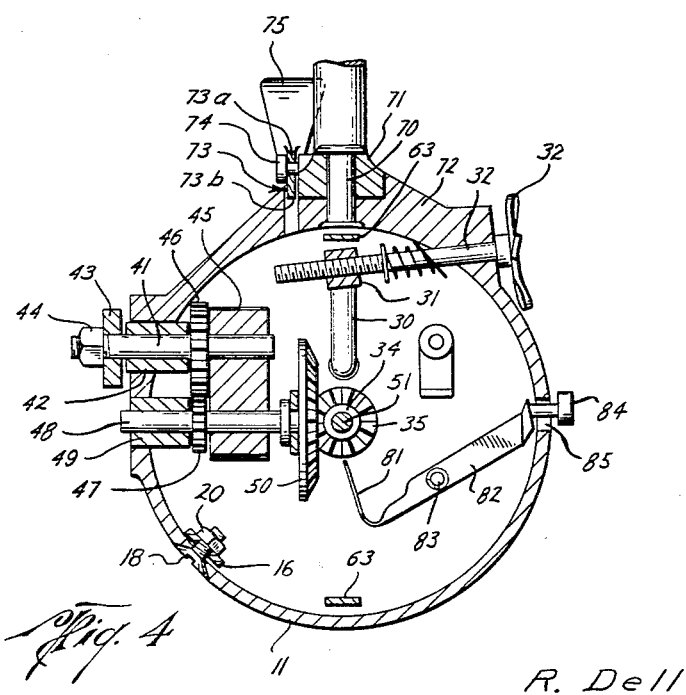

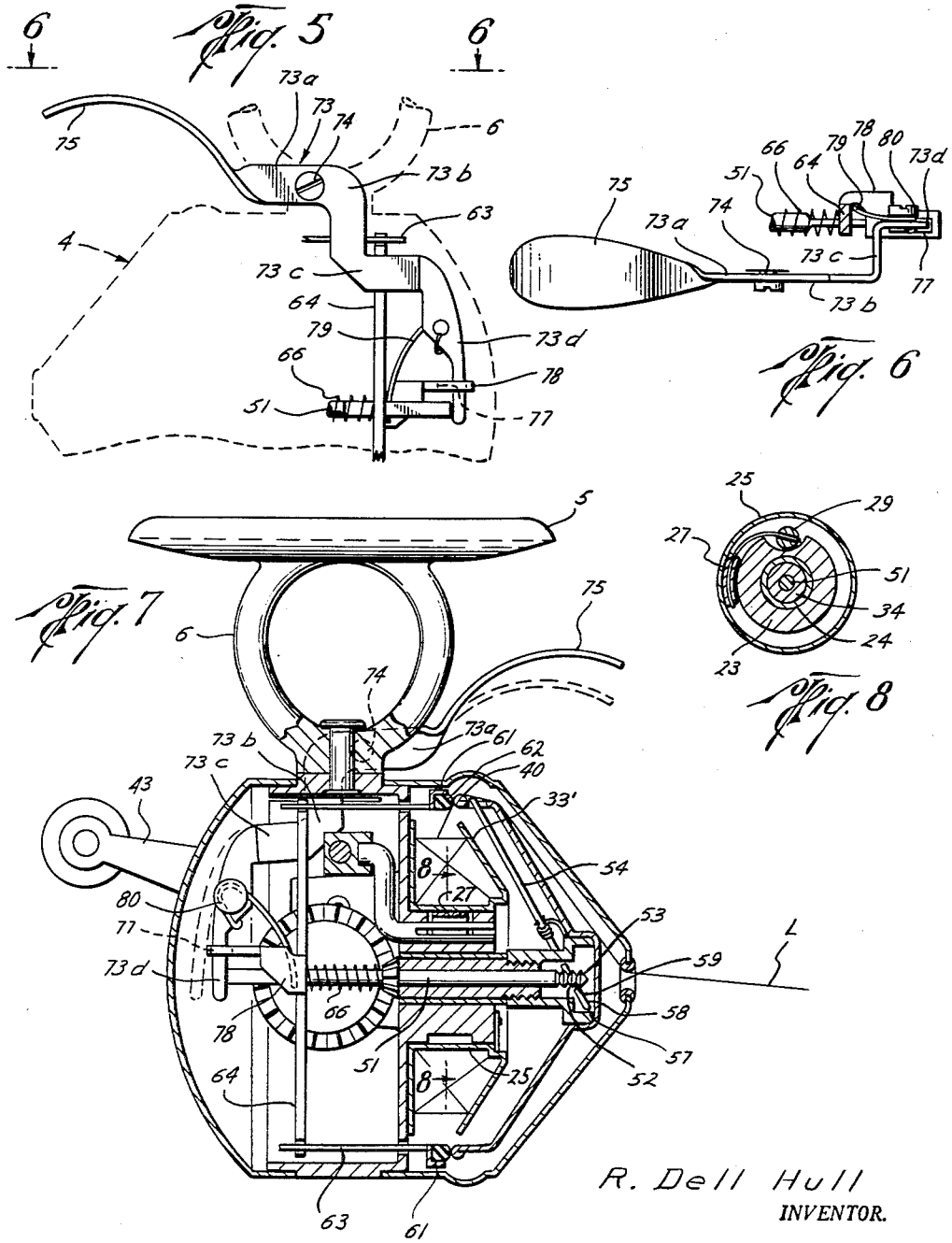

United States Patent Office 2,929,579
Patented Mar. 22, 1960

2,929,579

UNDERSLUNG SPINNING REEL

R. Dell Hull, Tulsa, Okla.

Application August 23, 1956, Serial No. 605,798

7 Claims. (Cl. 242—84.2)

This invention relates to fishing reels of the spinning type.

A primary object of the present invention is to provide improvements in the reel described in my co-pending application Serial No. 459,943, filed October 4, 1954 by providing an arrangement in which the reel is adapted to be mounted in "underslung" position beneath the rod handle, and arranged for operation in that position, whereas in the aforementioned application the reel construction is designed to dispose the reel on top of the rod for handling in the manner customarily employed in using a conventional casting reel.

A principal object of the present invention is to provide an "underslung" form of spinning reel which is mounted in fixed relation below the rod and provided with an improved line control and braking arrangement operable by a finger of the operator's hand which holds the rod, thereby facilitating the casting and braking of the line.

A further object is to provide an "underslung" reel arrangement in which the retrieving operation may be effected by forward rotation of the winding handle. By virtue of the improved construction, casting by the spinning reel method is greatly facilitated and complete control of the line may be exercised by the operator by using only one hand, both in handling the rod and in controlling the cast.

Other and more specific objects and advantages of this invention will become apparent from the detailed description when read in conjunction with the accompanying drawing which illustrates a useful embodiment in accordance with this invention.

In the drawing, Fig. 1 is an elevational view of the reel in position on a fishing rod;

Fig. 2 is a longitudinal sectional view of a reel, showing the parts in the line-retrieving position;

Figs. 3 and 4 are transverse cross-sectional views taken, respectively, along lines 3—3 and 4—4 of Fig. 2;

Fig. 5 is a fragmentary view, partly in section, taken along line 5—5 of Fig. 3;

Fig. 6 is a top plan view, looking down along line 6—6 of Fig. 5.

Fig. 7 is a view similar to Fig. 2, showing the position of the parts in the reel immediately preceding release of the line for casting; and Fig. 8 is a cross-section taken along line 8—8 of Fig. 7.

Referring to the drawing, reference numeral 1 designates generally a fishing rod of any desired and generally conventional construction adapted particularly for spinning reel operation. The rod is provided with a handle portion 2, having a reel-seating portion 3. The reel, designated generally by the numeral 4, is secured in depending position to a supporting plate 5 by means of an interposed ring bracket 6. The latter has a central opening 7 defining a finger stall adapted to receive a finger, generally the middle finger of the operator's hand which grips the rod handle. Supporting plate 5 is adapted to be inserted in reel-seating portion 3 which is provided with a securing ring 8 arranged to slide over one end of the plate 5, which is tapered, as at 9, to wedgingly clamp the supporting plate to the reel-seating portion. In the construction shown where the reel-seating portion of the rod merges with the handle portion, there is provided a slot 10 for reception of the rearward end of supporting plate 5.

Reel 4 comprises a tubular casing 11 formed of any suitable material, such as metal, rigid plastic, or the like, and is provided with a front cover 12 which fits snugly over the end of casing 11 and may be removed when desired. The forward portion of cover 12 is formed with a forwardly tapered conical portion 13 provided at its apex with a line guide opening 14. A rear cover 15 fits snugly over the rear of casing 11 and may be removed when desired. A clamping plate 16 (Figs. 3 and 4) may be provided interiorly of the casing extending across the joints between the casing and the front and rear covers. Screw 18 extends through the wall of casing 11 and thence through the clamping plate, being secured thereto by nut 20. By tightening screw 18 the clamping plate will be caused to clamp the covers to the casing and by loosening the screw the clamping plate may be loosened sufficiently to allow the covers to be pulled off of the ends of the casing.

A wall 22 extends across the forward end of casing 11 and has formed in the center thereof a forwardly projecting tubular hub 23, having a bore 24. A line spool 25 is mounted on hub 23 forwardly of wall 22 and is arranged for controlled rotation about hub 23, as will be more fully described hereinafter. A pivoted keeper 26 serves to releasably lock the spool on hub 23.

A slipping clutch or drag brake mechanism is arranged between the outer periphery of hub 23 and the interior wall of spool 25 and comprises an arcuate resilient metal shoe 27 positioned in an annular groove 28 provided in the periphery of hub 23 (see Fig. 8) one end of the brake shoe being fixed to a brake lever 29 extending longitudinally through hub 23 intermediate the inner and outer peripheries thereof. Oscillation of brake lever 29, the lever being secured to one end of the brake shoe, swings the free end of the brake shoe toward and away from the inner wall of spool 25 to correspondingly increase and decrease the frictional drag thereon in order to vary the drag force on the spool. The rearward end of brake lever 29 projects through wall 22 to the rear thereof and is connected to a crank 30 which carries a threaded crosshead 31 to which is threaded an adjusting rod 32 which extends through the wall of casing 11 to the exterior thereof, and is provided on its outer end with a star-shaped adjusting handle 32'. By rotating handle 32', crosshead 31 is caused to move back and forth along the threaded portion of rod 32 to thereby oscillate the brake lever, whereby to swing the brake shoe 27 toward or away from the inner surface of spool 25 to thereby adjust the drag pressure on the spool. This general type of braking mechanism is described in the aforementioned co-pending application, as well as in my co-pending application Serial No. 363,578, filed June 23, 1953, now abandoned in favor of continuation-in-part application, Ser. No. 615,708, filed October 12, 1956.

Line spool 25 is provided with a rear or inner end flange 33 which seats against the forward face of wall 22 and has a circular front flange 33' axially spaced from rear flange 33 and tapering outwardly and rearwardly toward the latter, thereby having the forwardly projecting generally conic form, as shown. A tubular shaft 34 extends axially through bore 24 and is rotatable therein and carries on its inner or rearward end a bevel gear 35 which is fixedly secured on the shaft and bears against the rear face of wall 22. The forward or outer end of shaft 34 extends in front of the forward end of spool 25 and is provided with external threads 36 adapted to threadedly receive a generally circular pick-up head 37 of rearwardly tapering generally conical shape, substantially paralleling forward flange 33' of the line spool. Pick-up head 37 is formed with a hollow central hub 38 which is internally threaded for threaded engagement with threads 36. A sleeve bearing 39 is disposed between shaft 34 and the wall of bore 24. Shaft 34 is provided with a shoulder 36' (Fig. 2) rearwardly of threads 36 to form a stop to limit the extent to which hub 38 will screw down over the end of shaft 34 to thereby provide a clearance space between pick-up head 37 and outer spool flange 33', as shown particularly in Figs. 2 and 7.

The outer periphery of pick-up head 37 is formed with a rearwardly extended annular flange 40 which projects over and closely adjacent the outer periphery of spool flange 33'.

A crank shaft 41 (Figs. 3 and 4) is mounted in casing 11 substantially at right angles to its longitudinal axis and projects radially through the wall of the casing through a bearing 42 and has mounted on its outer end a winding handle 43 which is secured on the shaft by means of a nut 44 screwed on the end of the shaft. The inner portion of crank shaft 41 is journalled in a support bearing 45 which is attached to wall 22. Crank shaft 41 has mounted thereon between bearings 42 and 45, a pinion 46 which is in mesh with a pinion 47 mounted on a countershaft 48 disposed parallel to shaft 41 and journalled at its outer end in a bearing 49 mounted in casing 11 and supported inwardly in bearing 45. The inner end of countershaft 48 carries a bevel gear 50 which is in mesh with bevel gear 35, whereby rotation of crank shaft 41 will rotate shaft 34 and pick-up head 37. A cylindrical rod 51 extends slidably through the bore of shaft 34 and through the center of bevel gear 35 and projects rearwardly therefrom. The forward end of rod 51 extends into the bore of hub 38, as best seen in Figs. 2 and 7, and is provided on its forward portion, just back of its forward end, with a short section of threads 52 of relatively coarse tapered form. The forward end of rod 51 is shaped to form a forwardly projecting conical surface 53. A line pick-up pin 54 is mounted for substantially radial slidable movement on the inner face of head 37 extending through a passage 55 in hub 38 alined with an opening 56 in flange 40. The inner end of pin 54 is bent upon itself to form a hook-shaped portion 57, having a bill portion 58 which is positioned for engagement with the threaded end of rod 51. The end of bill portion 58 is cut at an angle to the longitudinal axis of the pin to form a cam surface 59, having a slope or taper which is generally complementary to the slope of surface 53. Cam surface 59, by reason of its sloping form, provides a relatively sharp point at its upper or outer edge. The function of surface 53 and cam surface 59 and the point thereon together with threads 52 comprises means for projecting and retracting the outer end of pin 54 with respect to flange 40, and this form of pick-up means is described in greater detail in my aforementioned co-pending application Serial No. 459,943. A coil spring 60 has one end secured to pin 54 and the other to head 37, so as to normally urge pin 54 outwardly through opening 56.

Longitudinal movement of rod 51 and rotary movement of head 37 are employed to actuate pick-up pin 54 in the following manner: With rod 51 retracted to the position shown particularly in Fig. 2, pin 54 will be thrust radially outwardly through opening 56 under the urging of spring 60 and will be in position to engage the line L for rewinding the same on the spool. In this position, it will be seen that surface 59 on bill portion 58 will be engaged by conical surface 53 on the forward end of rod 51. In order to retract pin 54, rod 51 will be moved forwardly whereby the relative tapers of surfaces 53 and 59 will co-act to pull pin 54 inwardly against the resistance of spring 60 and the forward movement of rod 51 will then advance the threads 52 past the bill portion of the pin, as best seen in Fig. 7, by a ratching action due to the yieldable mounting of pin 54. The point on the end of the bill portion will thus function as a pawl and will be engaged in the threads 52, as shown in Fig. 7. This will serve to hold the pick-up pin in the retracted position, allowing line L to move freely across flange 40 and the edge of the pick-up head, as during casting. When it is again desired to project the pick-up pin to engage the line for rewinding, head 37 will be rotated by means of handle 43 in the rewinding direction. This will rotate the head and pin 54 around rod 51 and will act to unscrew bill portion 58 from its engagement with threads 52, and thereby urge rod 51 relatively rearwardly of the bill portion in response to this unthreading movement until bill portion 58 has been completely released from its engagement with rod 51, whereupon spring 60 will project the pin outwardly to the position shown in Fig. 2.

The reel includes a line control or brake mechanism of the general type disclosed in my U.S. Patent No. 2,675,192, and includes a ring-shaped brake member 61 mounted in front of wall 22 and provided with a lining 62, composed of any suitable friction-creating material such as rubber, plastic, or other composition material. Brake member 61 is radially and annularly dimensioned so that when moved forwardly it will annularly engage the inner edge of flange 40 and thereby clamp or brake the movements of line L passing to and from spool 25 (Fig. 7). A pair of diametrically spaced rods 63—63 are secured to brake member 61 and project rearwardly through suitable openings in wall 22 and have their rearward ends secured to the opposite ends of a brake lever 64 which extends diametrically of casing 11. The center of brake lever 64 is provided with a rectangular opening 65 (Fig. 3) through which a flattened portion of rod 51 extends slidably rearwardly of lever 64, whereby to hold rod 51 against rotation. A coil spring 66 is mounted about rod 51 in compression between bevel gear 35 and brake lever 64 urging the latter and its connected brake member 61 rearwardly and, therefore, out of braking engagement with flange 40.

Casing 11 is secured to the lower side of ring bracket 6 as by means of a rivet 70 which extends through a boss 71 projecting from the lower side of the ring bracket and fitted in a thickened portion 72 of casing 11. A bell crank 73, comprising the arms 73a and 73b (as best seen in Figs. 3 to 6), is pivoted at one side of portion 72 on a pivot 74 to swing in a plane parallel to the plane of ring bracket 6. Arm 73a projects forwardly of bracket 6 and terminates in a curved finger grip 75 shaped to permit the forefinger of the operator to be inserted thereunder (Fig. 1) for lifting the forward end of arm 73a. Arm 73b of the bell crank extends downwardly substantially at right angles to arm 73a and passes through a slot 76 in the wall of casing 11 (Fig. 3) into the interior thereof. The inner end of arm 73b is integrally connected through a lateral offset 73c to a downwardly extending toe portion 73d, the end of which registers with and engages the free end of rod 51. Toe portion 73d passes through a guide slot 77 (Figs. 5 and 6) provided in a guide bracket 78 secured to and projecting rearwardly from brake lever 64 in order to hold the end of toe portion 73d in alignment with the end of rod 51. Slot 77 is slightly elongated to provide a small amount of clearance between the toe portion and the forward end of the slot to permit a small degree of relative forward movement between the toe portion and guide bracket 78 for purposes to be more fully explained hereinafter. A wire spring 79 has one end fixedly secured to toe portion 73d by means of the screw 80 and its free end in compressive engagement with the rear face of brake lever 64 to resiliently urge the latter forwardly relative to toe portion 73d against the resistance of coil spring 66.

A spring click member 81 is mounted on an operating arm 82 which is pivoted at 83 to the rear face of wall 22 to swing the click member into and out of clicking engagement with the teeth of bevel gear 35 by means of an operating button 84 which projects through an opening 85 in the wall of casing 11.

The above-described reel operates in the following manner: It will be assumed that a rewinding operation has just been completed. At this stage the parts of the reel will be in the positions as best seen in Fig. 2, in which it will be noted that bill portion 58 of the pick-up pin is riding on end surface 53 of rod 51, and the outer end of pick-up pin 54 is projecting through flange 40 into engagement with line L, and that brake member 61 and brake lever 64 are in their rearwardly retracted positions under the urging of spring 66. In this position, also, the lever arm 73a and finger grip 75 will be in the normal relatively downward opposition, shown in full lines in Fig. 2, being urged to this position by the force of spring 66 together with that of spring 79, acting to urge toe portion 73d to its rearward position in guide slot 77.

To prepare the reel for casting, the operator pulls his forefinger upwardly beneath finger grip 75 to the position shown in full lines in Fig. 7. This upward movement of the finger grip operates through bell crank lever 73 to perform two successive operations; first, the upward movement of the finger grip will swing toe portion 73d forwardly. This movement causes spring 79 to urge brake lever 64 forwardly, moving brake member 61, with its brake lining 62, against the rearward edge of flange 40 to thereby clamp line L between the flange and the brake member. This position is best seen in Fig. 7. Second, as spring 79 compresses, toe portion 73d will continue to swing forwardly in slot 77 sufficiently to engage and press forwardly against the rearward end of rod 51, moving threads 52 across cam surface 59 of the pick-up pin 54 and causing the latter to be retracted relative to flange 40, thereby releasing line L from engagement with the pick-up pin and freeing it for casting, this position being likewise shown in Fig. 7. The finger pressure beneath finger grip 75 is thereupon released which will release the pressure on the brake member and allow the latter to retract in order to free the line from gripping engagement between the brake member and the edge of flange 40. This release will be allowed to occur at the proper stage in the casting movement, so that the force of the cast will be exerted at the moment of release and carry line L off the spool for a distance in accordance with the force of the cast and the weight of the lure. As the line flows from spool 25, the operator may, by appropriate exertion of lifting pressure of his finger on finger grip 75, move the brake member to braking engagement with the line as it passes over the edge of the flange, thereby controlling the extent of the cast. The cast is thus always fully under control of the operator merely by manipulation of his forefinger beneath the finger grip.

When it is desired to rewind the line, the hand of the operator not holding the rod is used to rotate handle 43 in the forward direction. Thus if the operator holds the rod in his right hand, he may, by using his left hand, turn handle 43 forwardly to wind-in the line. As handle 43 is turned forwardly it will act through the gear train, formed by pinions 46 and 47 and bevel gears 50 and 35, to rotate pick-up head 37 around rod 51. The rotation of head 37 will cause pick-up pin 54 to rotate therewith and the direction of rotation will be such that the end of bill portion 58 will be unscrewed from threads 52, rod 51 being thereby urged rearwardly sufficiently to release the engagement of bill portion 58 with the threaded end of the rod and allow the pick-up pin 54 to be projected into line-engaging position. The pitch of threads 52 will ordinarily be so selected that a forward movement of handle 43 through only a part of a complete rotation will be sufficient to release the pick-up pin for projection into the line pick-up position. Continued forward rotation of handle 43 will then serve to rewind the line on spool 25, the parts in this operation being in the position shown in Fig. 2. When the rewinding has been completed, the reel will be ready for another casting operation.

The drag brake formed by brake shoe 27 may be adjusted through rotation of star handle 33 to apply the desired drag pressure on the line spool to provide the requisite degree of slippage under load, which will prevent breakage of the line.

It will be apparent from the foregoing description that by the provision of the "underslung" reel arrangement in combination with the finger grip control, as described, provides many advantages in the operation of spinning reels as compared with prior devices of this general character. While a preferred form of the invention has been shown and described, it will be understood, of course, that modifications therein, within the scope of the appended claims may be made without departing from the spirit of the invention.

I claim:

1. In a fishing reel of the spinning type, including a casing, a line-carrying spool mounted in the casing, a line pickup head mounted for rotation in the forward portion of said casing adjacent said spool to wind line on said spool, line-engaging means carried by said line pickup head and movable to one position in which it is free from engagement with said line as said line leaves said spool as during casting, operating means for moving said line-engaging means to said one position, and mounting means for said reel, the improvement characterized by said mounting means comprising a ring bracket secured to said casing intermediate its front and rear ends for mounting said reel on a rod in spaced relation to said rod and adapted to receive therethrough a finger of a user's hand supporting said rod to properly position said user's hand on said rod in relation to the rod and to said reel when mounted thereon, and said operating means comprising a finger-engageable lever pivoted on said casing and having a portion extending forwardly of said ring bracket for engagement in front of said ring bracket by a finger of the user's hand.

2. In a fishing reel of the spinning type, including a casing, a line-carrying spool mounted in the casing, a line pickup head mounted for rotation in said casing adjacent said spool to wind line on said spool, line-engaging means carried by said line pickup head and movable to one position to engage line passing to said spool and to a second position in which it is free from engagement with said line as said line leaves said spool as during casting, and means for moving said line-engaging means to said second position, the improvement which comprises a bracket secured to said casing for mounting said reel below and in spaced relation to a rod and a control lever pivoted on the casing and operatively engageable within the casing with the means for moving said line-engaging means to said second position, said control lever extending out of said casing and having a finger-engageable portion located adjacent said bracket substantially between said reel and the rod.

3. A fishing reel according to claim 2 in which the finger-engaging portion of the control lever extends forwardly of the bracket in the direction of the line discharge end of the reel for engagement forwardly of the bracket by a finger of the user's hand.

4. A fishing reel according to claim 2 in which the bracket is a ring bracket and is adapted to receive therethrough a finger of a user's hand to properly position his hand for holding said rod and with respect to the finger-engaging portion of the control lever.

5. A fishing reel according to claim 2, which includes a brake member mounted in said casing and movable into braking co-operation with said line pickup head to prevent passage of line from said spool, and means normally maintaining said brake member out of braking co-operation with said pickup head, and in which said control lever is operatively engageable, upon actuation by a user, with said brake member to move said brake member into braking co-operation with said line pickup head.

6. In a fishing reel of the spinning type, including a casing, a line-carrying spool mounted in the casing, a line pickup head mounted for rotation in said casing adjacent said spool to wind line on said spool, line-engaging means carried by said line pickup head and movable to one position to engage line passing to said spool and to a second position in which it is free from engagement with said line as said line leaves said spool as during casting, and means for moving said line-engaging means to said second position, the improvement which comprises a bracket extending upwardly from said casing intermediate its ends for mounting the reel below and in spaced relation to a rod, a control lever operatively engageable within the casing with the means for moving said line-engaging means to said second position and extending out of said casing and having a finger-engageable portion extending along the side of the casing and located substantially between said reel and a rod upon which it is mounted.

7. A fishing reel according to claim 6 which includes a brake member mounted in said casing and movable into braking cooperation with said line pickup head to prevent passage of line from said spool, and means normally maintaining said brake member out of braking cooperation with said pickup head, and in which said control lever is operatively engageable, upon upward pull upon the finger-engageable portion of the control lever, with said brake member to move said brake member into braking cooperation with said line pickup head.

References Cited in the file of this patent
UNITED STATES PATENTS

| | | |
|---|---|---|
| 1,903,559 | Shakespeare | Apr. 11, 1933 |
| 2,116,959 | Brown et al. | May 10, 1938 |
| 2,614,767 | Dean | Oct. 21, 1952 |
| 2,668,025 | Hull | Feb. 2, 1954 |
| 2,675,192 | Hull | Apr. 13, 1954 |

FOREIGN PATENTS

| | | |
|---|---|---|
| 740,296 | Great Britain | Nov. 3, 1953 |